United States Patent
Itakura et al.

(10) Patent No.: US 10,712,058 B2
(45) Date of Patent: Jul. 14, 2020

(54) ROTARY COMPRESSOR AND REFRIGERATION CYCLE DEVICE

(71) Applicant: FUJITSU GENERAL LIMITED, Kanagawa (JP)

(72) Inventors: Shunji Itakura, Kanagawa (JP); Ken Horiguchi, Kanagawa (JP); Toshiyuki Fuji, Kanagawa (JP); Sota Shimada, Kanagawa (JP); Kazuya Funada, Kanagawa (JP); Kenji Komine, Kanagawa (JP); Junya Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 242 days.

(21) Appl. No.: 15/882,324

(22) Filed: Jan. 29, 2018

(65) Prior Publication Data

US 2018/0216856 A1    Aug. 2, 2018

(30) Foreign Application Priority Data

Jan. 30, 2017  (JP) ................................ 2017-014802

(51) Int. Cl.
*F03C 2/00* (2006.01)
*F03C 4/00* (2006.01)
(Continued)

(52) U.S. Cl.
CPC ............ *F25B 31/026* (2013.01); *C09K 5/045* (2013.01); *F04C 13/001* (2013.01);
(Continued)

(58) Field of Classification Search
CPC .. F04C 18/3564; F04C 13/001; F04C 23/008; F04C 2210/26; F04C 2210/263;
(Continued)

(56) References Cited

U.S. PATENT DOCUMENTS

2012/0087822 A1* 4/2012 Nakano ................. C09K 5/045
                                                                418/178
2012/0131947 A1* 5/2012 Nakano ................. C09K 5/045
                                                                 62/468
(Continued)

FOREIGN PATENT DOCUMENTS

EP          1359324 A2    11/2003
WO    WO 2012/157764 A1    11/2012

OTHER PUBLICATIONS

May 29, 2018, European Search Report issued for related EP Application No. 18154261.4.

*Primary Examiner* — Theresa Trieu
(74) *Attorney, Agent, or Firm* — Paratus Law Group, PLLC

(57) ABSTRACT

A rotary compressor includes: a closed upright cylindrical compressor housing including an upper portion provided with a discharge section of refrigerant and a body portion provided with an intake section of the refrigerant; a compression section disposed at a lower part in the compressor housing and configured to compress the refrigerant suctioned by the intake section to discharge the refrigerant from the discharge section; and a motor disposed at an upper part in the compressor housing and configured to drive the compression section. The motor has a rotor disposed on an inner side and a stator disposed on an outer side, the refrigerant is HFO1123 refrigerant or a refrigerant mixture containing the HFO1123 refrigerant, and an inner welded portion formed by welding using flux is provided within a projection area of the rotor at the upper portion of the compressor housing.

7 Claims, 4 Drawing Sheets

(51) Int. Cl.
  *F04C 11/00* (2006.01)
  *F25B 31/02* (2006.01)
  *F04C 18/356* (2006.01)
  *F04C 23/00* (2006.01)
  *C09K 5/04* (2006.01)
  *F04C 13/00* (2006.01)

(52) U.S. Cl.
  CPC ........ *F04C 18/3564* (2013.01); *F04C 23/008* (2013.01); *C09K 2205/126* (2013.01); *F04C 2210/26* (2013.01); *F04C 2210/263* (2013.01); *F04C 2230/231* (2013.01); *F04C 2240/30* (2013.01); *F04C 2240/806* (2013.01); *F25B 2400/07* (2013.01); *F25B 2400/19* (2013.01)

(58) Field of Classification Search
  CPC ............ F04C 2230/231; F04C 2240/30; F04C 2240/806; F25B 31/026; F25B 2400/07; F25B 2400/19; C09K 5/045; C09K 2205/126
  USPC .......... 418/11, 60, 63, 270, 34; 62/468, 498, 62/510
  See application file for complete search history.

(56) References Cited

U.S. PATENT DOCUMENTS

2013/0098101 A1* 4/2013 Ishida .................... C09K 5/045
                                                           62/468
2013/0167580 A1   7/2013 Ishida et al.

\* cited by examiner

ROTARY COMPRESSOR AND REFRIGERATION CYCLE DEVICE

CROSS-REFERENCE TO RELATED APPLICATION

This application claims priority from Japanese Patent Application No. 2017-014802 filed with the Japan Patent Office on Jan. 30, 2017, the entire content of which is hereby incorporated by reference.

FIELD

The present disclosure relates to a rotary compressor and a refrigeration cycle device.

BACKGROUND

In a refrigeration cycle device including a compressor configured to compress refrigerant, R410A refrigerant as hydrofluorocarbon (HFC) has been broadly used as the refrigerant. However, the R410A refrigerant has a great global warming potential (GWP). In a known related technique, hydrofluoroolefin (HFO) 1123 refrigerant and a refrigerant mixture containing the HFO1123 refrigerant are used as refrigerant having a relatively-small GWP.

Note that the technique of this area is disclosed in WO 2012/157764 A, for example.

SUMMARY

A rotary compressor includes: a closed upright cylindrical compressor housing including an upper portion provided with a discharge section of refrigerant and a body portion provided with an intake section of the refrigerant; a compression section disposed at a lower part in the compressor housing and configured to compress the refrigerant suctioned by the intake section to discharge the refrigerant from the discharge section; and a motor disposed at an upper part in the compressor housing and configured to drive the compression section. The motor has a rotor disposed on an inner side and a stator disposed on an outer side, the refrigerant is HFO1123 refrigerant or a refrigerant mixture containing the HFO1123 refrigerant, and an inner welded portion formed by welding using flux is provided within a projection area of the rotor at the upper portion of the compressor housing.

DESCRIPTION OF THE EMBODIMENTS

Figure 1:
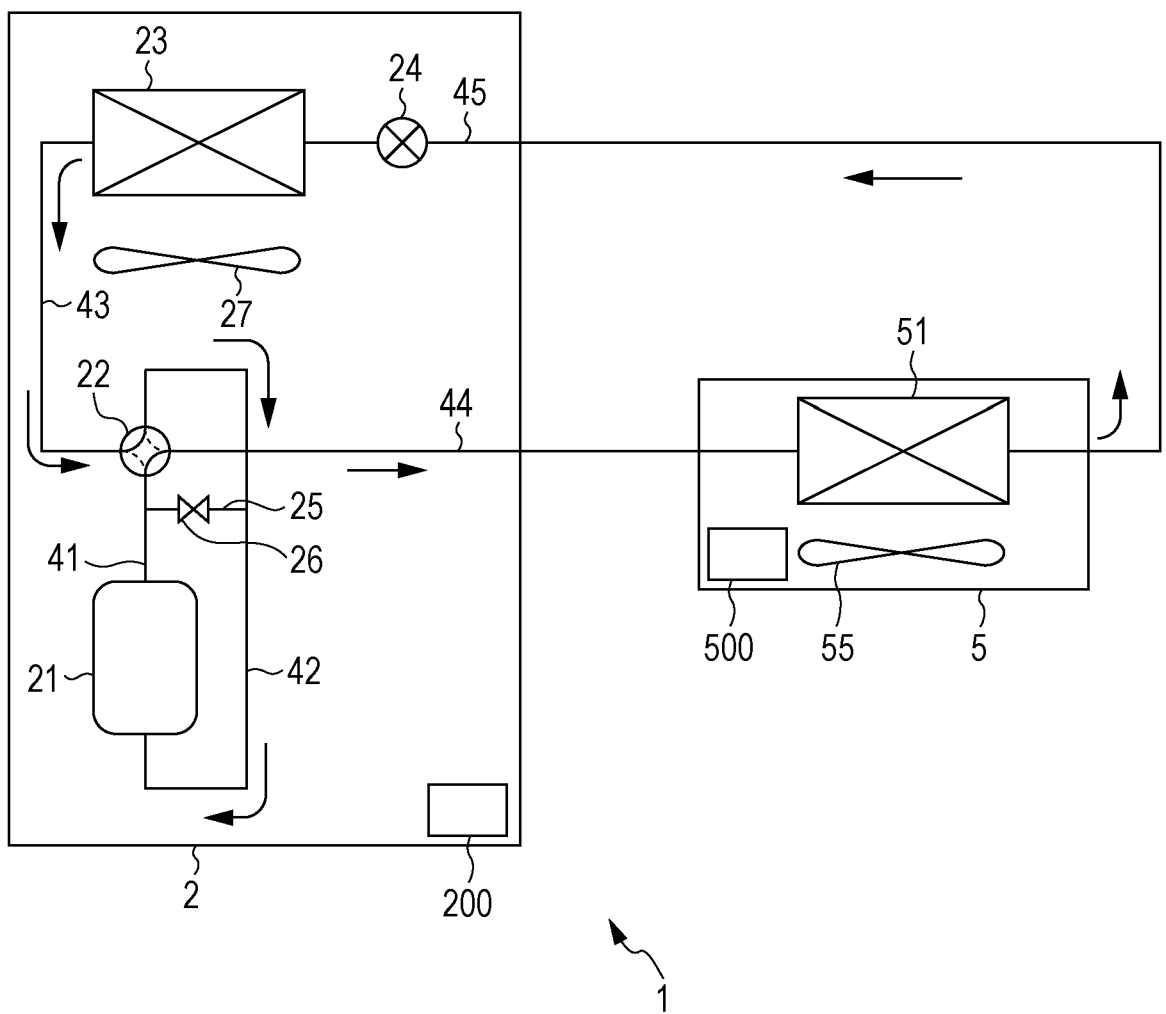
FIG. 1 is a refrigerant circuit diagram of a refrigeration cycle device of a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, the HFO1123 refrigerant has such properties that disproportional reaction represented by the following chemical reaction formula is caused under predetermined conditions.

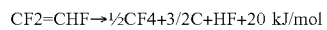

The disproportional reaction is, for example, caused when a temperature or a pressure increases with a high density of HFO1123 refrigerant or when some kind of strong energy is applied to the HFO1123 refrigerant. When the disproportional reaction is caused in the HFO1123 refrigerant, great heat is generated due to such reaction. For this reason, in a case where the disproportional reaction is caused, there is a probability that operation reliability of the refrigeration cycle device including the compressor lowers and that a pipe in the refrigeration cycle device is damaged due to a rapid pressure increase.

At the step of manufacturing a compressor housing provided at a rotary compressor, welding such as brazing is performed for joint between an upper portion and a body portion of the compressor housing and joint between a refrigerant discharge section and the upper portion of the compressor housing. Upon such welding, flux is applied to a joint surface for removal of an oxidative product from a welded portion and protection of the joint surface, for example. Thus, potassium as a main component of the flux remains on the welded portion. Meanwhile, part of the HFO1123 refrigerant discharged from a compression section into the compressor housing passes through a clearance between an outer peripheral side of a rotor rotating in a stator and an inner peripheral side of the stator. Such part of the refrigerant is directly sprayed onto the upper portion of the compressor housing, and then, collides with the upper portion of the compressor housing. In a case where the HFO1123 refrigerant is sprayed onto the welded portion of the upper portion of the compressor housing, the potassium remaining on the welded portion serves as a catalyst, and reduces activation energy of the disproportional reaction of the HFO1123 refrigerant. For this reason, collision energy upon collision of the HFO1123 refrigerant with the welded portion is provided to the HFO1123 refrigerant. Thus, there is a probability that the disproportional reaction is easily caused in the HFO1123 refrigerant. That is, the collision energy easily increases beyond the activation energy of the disproportional reaction, and therefore, the disproportional reaction is easily caused.

One object of the technique of the present disclosure is to provide a rotary compressor and a refrigeration cycle device configured so that the disproportional reaction of the refrigerant can be reduced.

A rotary compressor according to an aspect of the present application includes: a closed upright cylindrical compressor housing including an upper portion provided with a discharge section of refrigerant and a body portion provided with an intake section of the refrigerant; a compression section disposed at a lower part in the compressor housing and configured to compress the refrigerant suctioned by the intake section to discharge the refrigerant from the discharge section; and a motor disposed at an upper part in the compressor housing and configured to drive the compression section. The motor has a rotor disposed on an inner side and a stator disposed on an outer side, the refrigerant is HFO1123 refrigerant or a refrigerant mixture containing the HFO1123 refrigerant, and an inner welded portion formed by welding using flux is provided within a projection area of the rotor at the upper portion of the compressor housing.

According to the above-described rotary compressor, the disproportional reaction of the refrigerant can be reduced.

Hereinafter, embodiments of a rotary compressor and a refrigeration cycle device disclosed in the present application will be described in detail with reference to the drawings. Note that the following embodiments are not intended to limit the rotary compressor and the refrigeration cycle device disclosed in the present application.

First Embodiment

[Configuration of Refrigeration Cycle Device]

FIG. 1 illustrates a refrigerant circuit of a refrigeration cycle device of the present embodiment. The refrigeration cycle device 1 is applied to an air conditioner configured to perform cooling/heating in a room. As illustrated in FIG. 1, the refrigeration cycle device 1 includes an outdoor unit 2 and an indoor unit 5. The outdoor unit 2 includes a rotary compressor 21, a four-way valve 22, an outdoor heat exchanger 23, a throttle device (a decompressor) 24, a bypass line 25, a bypass valve 26, and an outdoor-unit controller 200.

The rotary compressor 21 includes a discharge opening 18 as a discharge section, and an intake opening 19 as an intake section. The rotary compressor 21 is controlled by the outdoor-unit controller 200 such that refrigerant supplied from the intake opening 19 through the four-way valve 22 and an intake pipe 42 is compressed and that the compressed refrigerant is supplied from the discharge opening 18 to the four-way valve 22 through a discharge pipe 41. HFO1123 refrigerant or a refrigerant mixture containing the HFO1123 refrigerant is used as the refrigerant.

The four-way valve 22 is connected to the discharge pipe 41 and the intake pipe 42. Further, the four-way valve 22 is connected to the outdoor heat exchanger 23 via a refrigerant pipe 43, and is connected to the indoor unit 5 via a refrigerant pipe 44. The indoor unit 5 and the outdoor heat exchanger 23 are connected together via a refrigerant pipe 45. The outdoor-unit controller 200 controls the four-way valve 22 to set the four-way valve 22 to either one of a heating mode or a cooling mode. With setting of the four-way valve 22 to the heating mode, an operation mode of the refrigeration cycle device 1 is set to a heating operation mode. With setting of the four-way valve 22 to the cooling mode, the operation mode of the refrigeration cycle device 1 is, on the other hand, set to a cooling operation mode.

When being set to the cooling mode, the four-way valve 22 supplies the outdoor heat exchanger 23 with the refrigerant discharged from the rotary compressor 21 through the discharge pipe 41. Further, the four-way valve 22 supplies, through the intake pipe 42, the rotary compressor 21 with the refrigerant having flowed out of the indoor unit 5. When being set to the heating mode, the four-way valve 22 supplies the indoor unit 5 with the refrigerant discharged from the rotary compressor 21 through the discharge pipe 41. Further, the four-way valve 22 supplies, through the intake pipe 42, the rotary compressor 21 with the refrigerant having flowed out of the outdoor heat exchanger 23.

The outdoor heat exchanger 23 is connected to the throttle device 24 via the refrigerant pipe 45. An outdoor fan 27 is disposed in the vicinity of the outdoor heat exchanger 23. The outdoor fan 27 is rotated by a fan motor (not shown), thereby taking ambient air in the outdoor unit 2. After heat exchange between the ambient air and the refrigerant by the outdoor heat exchanger 23, the outdoor fan 27 releases such ambient air to the outside of the outdoor unit 2. In the case of the cooling operation mode, the outdoor heat exchanger 23 performs heat exchange between the refrigerant supplied from the four-way valve 22 and the ambient air taken into the outdoor unit 2, and then, supplies the throttle device 24 with the refrigerant subjected to heat exchange. In the heating operation mode, the outdoor heat exchanger 23 performs heat exchange between the refrigerant supplied from the throttle device 24 and the ambient air taken into the outdoor unit 2, and then, supplies the four-way valve 22 with the refrigerant subjected to heat exchange.

The throttle device 24 is connected to the indoor unit 5 via the refrigerant pipe 45. In the case of the cooling operation mode, the throttle device 24 decompresses, by adiabatic expansion, the refrigerant supplied from the outdoor heat exchanger 23. The throttle device 24 supplies the indoor unit 5 with the two-phase refrigerant having reached a lower temperature and a lower pressure by adiabatic expansion. In the case of the heating operation mode, the throttle device 24 decompresses, by adiabatic expansion, the refrigerant supplied from the indoor unit 5. The throttle device 24 supplies the outdoor heat exchanger 23 with the two-phase refrigerant having reached a lower temperature and a lower pressure by adiabatic expansion. Further, the opening degree of the throttle device 24 is adjusted by control by the outdoor-unit controller 200. In the case of the heating operation mode, the outdoor-unit controller 200 adjusts the opening degree of the throttle device 24 to adjust the flow rate of the refrigerant supplied from the indoor unit 5 to the outdoor heat exchanger 23. In the case of the cooling operation mode, the outdoor-unit controller 200 adjusts the opening degree of the throttle device 24 to adjust the flow rate of the refrigerant supplied from the outdoor heat exchanger 23 to the indoor unit 5.

The bypass line 25 connects the discharge pipe 41 and the intake pipe 42 together. The bypass valve 26 is provided in the middle of the bypass line 25. The bypass valve 26 is controlled by the outdoor-unit controller 200, thereby supplying the refrigerant from the discharge pipe 41 to the intake pipe 42 through the bypass line 25 or stopping a refrigerant supply from the discharge pipe 41 to the intake pipe 42.

The indoor unit 5 has an indoor heat exchanger 51, an indoor fan 55, and an indoor-unit controller 500. The indoor fan 55 is disposed in the vicinity of the indoor heat exchanger 51. The indoor fan 55 is rotated by a fan motor (not shown), thereby taking indoor air in the indoor unit 5. After heat exchange between the indoor air and the refrigerant by the indoor heat exchanger 51, the indoor fan 55 releases such indoor air to the inside of the room. The indoor heat exchanger 51 is connected to the four-way valve 22 of the outdoor unit 2 via the refrigerant pipe 44, and is connected to the throttle device 24 of the outdoor unit 2 via the refrigerant pipe 45. When the operation mode of the refrigeration cycle device 1 is set to the cooling operation mode, the indoor heat exchanger 51 functions as an evaporator. On the other hand, when the operation mode of the refrigeration cycle device 1 is set to the heating operation mode, the indoor heat exchanger 51 functions as a condenser. That is, in the case of the cooling operation mode, the indoor heat exchanger 51 performs heat exchange between the low-temperature low-pressure two-phase refrigerant supplied from the throttle device 24 and the indoor air taken into the indoor unit 5. After heat exchange, the indoor heat exchanger 51 releases such indoor air to the inside of the room, and supplies such refrigerant to the four-way valve 22. In the case of the heating operation mode, the indoor heat exchanger 51 performs heat exchange between the refrigerant supplied from the four-way valve 22 and the indoor air taken into the indoor unit 5. After heat exchange, the indoor heat exchanger 51 releases such indoor air to the inside of the room, and supplies such refrigerant to the throttle device 24.

[Configuration of Rotary Compressor]

Figure 2:
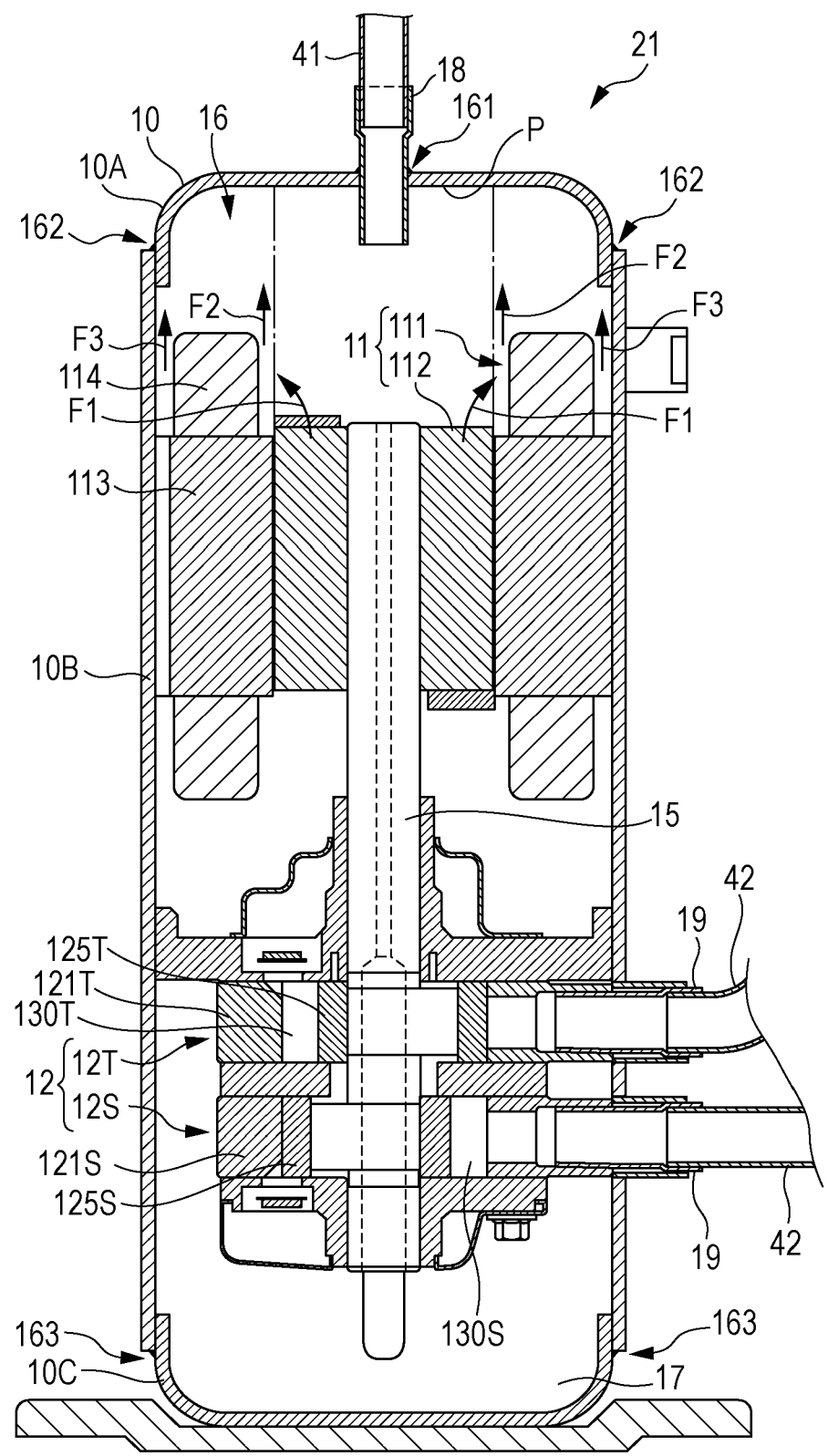
FIG. 2 is a longitudinal sectional view of a rotary compressor of the first embodiment.
Figure 3:
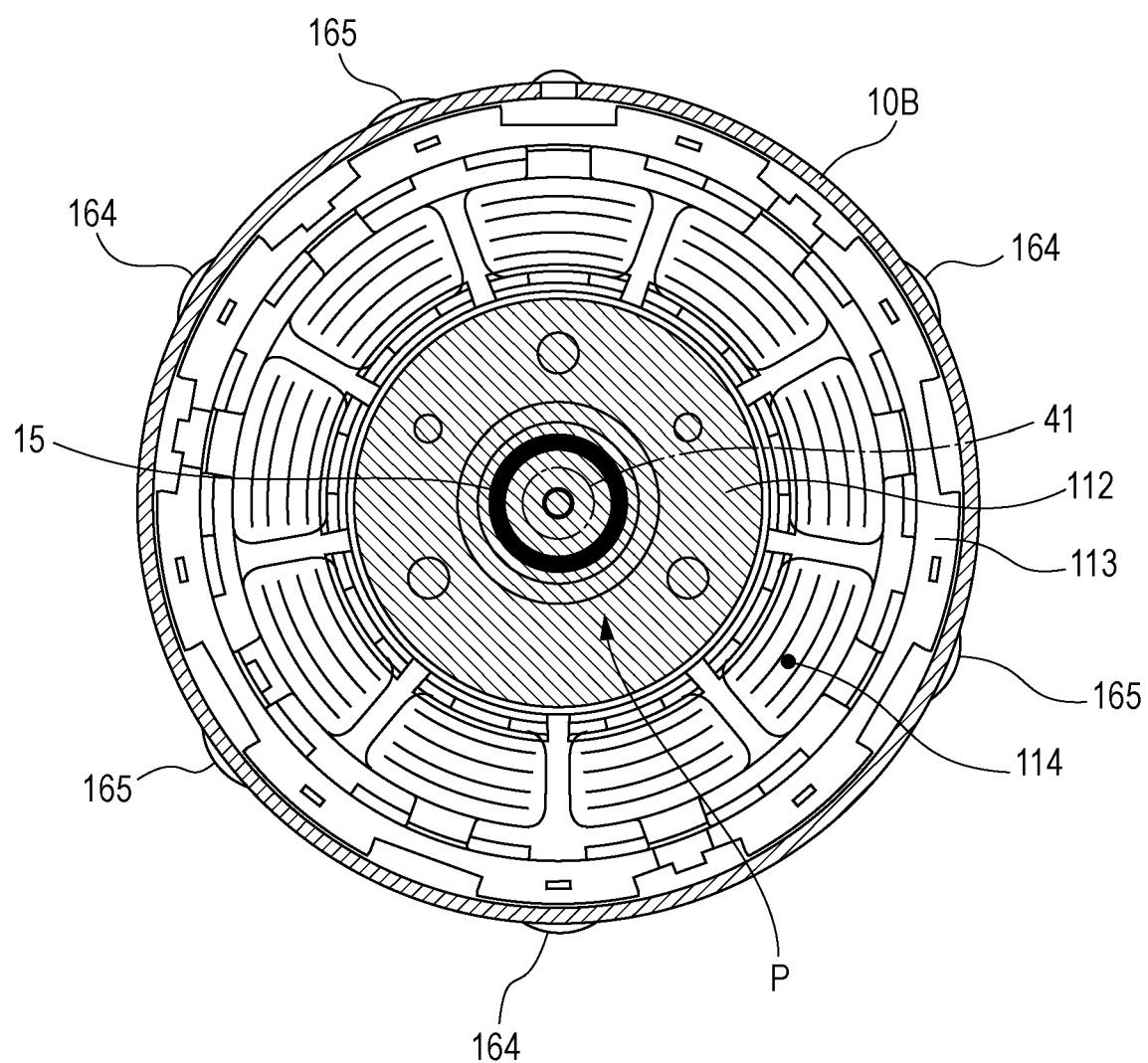
FIG. 3 is a cross-sectional view of the rotary compressor of the first embodiment.

FIG. 2 is a longitudinal sectional view of the rotary compressor of the first embodiment. FIG. 3 is a cross-sectional view of the rotary compressor of the first embodiment. As illustrated in FIGS. 2 and 3, the rotary compressor 21 includes a compressor housing 10, a rotary shaft 15, a motor 11 configured to rotate the rotary shaft 15, and a compression section 12 to be driven by rotation of the rotary shaft 15.

The compressor housing 10 has a body portion 10B formed in a substantially cylindrical shape, an upper portion 10A, and a lower portion 10C. The upper portion 10A closes an opening of the body portion 10B from above. The lower portion 10C closes an opening of the body portion 10B from below. The compressor housing 10 forms an internal space 16 closed (isolated) from external environment where the rotary compressor 21 is placed. That is, the compressor housing 10 is closed. The compressor housing 10 is disposed such that the center axis of the cylindrical compressor housing 10 is parallel with the vertical direction when the compressor housing 10 is placed perpendicular to the horizontal plane. In the closed upright cylindrical compressor housing 10, the upper portion 10A and the body portion 10B are joined together by welding using flux, such as brazing or arc welding, for example. Further, the cylindrical body portion 10B and the lower portion 10C are similarly joined together.

In the compressor housing 10, an oil reservoir 17 is provided at a lower portion of the internal space 16. Lubricant oil for lubrication of the compression section 12 is stored in the oil reservoir 17. In the compressor housing 10, the internal space 16 is connected to the intake openings 19 and the discharge opening 18. The discharge opening 18 is connected to the discharge pipe (the discharge section) 41. The intake openings 19 are connected to the intake pipes (the intake sections) 42. The rotary shaft 15 is formed in a round bar shape, and is disposed in the internal space 16 of the compressor housing 10. The rotary shaft 15 is, on the center axis of the cylindrical compressor housing 10, supported by the compressor housing 10 to rotate about the center axis.

[Configuration of Motor]

The motor 11 is disposed at an upper part in the internal space 16 of the compressor housing 10. The motor 11 has a rotor 112 disposed on an inner side, and a stator 111 disposed on an outer side. The rotor 112 is formed in a substantially circular columnar shape, and is fixed to the rotary shaft 15. The stator 111 is formed in a substantially cylindrical shape. The stator 111 is disposed to surround an outer peripheral side of the rotor 112, and is fixed to the compressor housing 10. The stator 111 has a stator core 113 and multiple windings 114. The multiple windings 114 are each wound around multiple tooth portions formed at the stator core 113.

In the motor 11, three-phase current is applied to the multiple windings 114, and accordingly, a rotating magnetic field is generated by the stator 111. By the rotating magnetic field generated by the stator 111, the rotor 112 rotates together with the rotary shaft 15. That is, the three-phase current is applied to the multiple windings 114, and accordingly, the motor 11 rotates the rotary shaft 15. In the motor 11, when open-phase current is applied to the multiple windings 114, no rotating magnetic field is generated by the motor 11, and therefore, the rotary shaft 15 is not rotated. The open-phase current is current lacking one or two phases of three-phase current. While operation of the refrigeration cycle device 1 is stopped, the motor 11 generates heat due to application of the open-phase current to the multiple windings 114, thereby heating the refrigerant and the lubricant oil in the internal space 16 of the compressor housing 10.

[Configuration of Compression Section]

The compression section 12 is disposed at a lower part in the compressor housing 10. The rotary compressor 21 of the first embodiment has, as the compression section 12, a first compression section 12S and a second compression section 12T. The first compression section 12S has a first cylinder 121S, a first annular piston 125S, and a first vane (not shown). The first cylinder 121S forms a first cylinder chamber 130S. The first annular piston 125S is disposed in the first cylinder chamber 130S, and is slidably supported by the rotary shaft 15. The first vane is supported by the first cylinder 121S to slide on the first cylinder chamber 130S. By abutting between the first vane and the first annular piston 125S, the inside of the first cylinder chamber 130S is divided into a suction chamber and a compression chamber. The suction chamber is not connected to the internal space 16 of the compressor housing 10, but is connected to the intake openings 19.

In the first cylinder chamber 130S, the volume of the suction chamber increases in association with rotation of the rotary shaft 15. After having increased to a predetermined volume, the volume of the suction chamber decreases. When the volume of the suction chamber decreases, the volume of the compression chamber increases, and a portion forming the suction chamber transitions to the compression chamber. The compression chamber is not connected to the intake openings 19, but is connected to the internal space 16 of the compressor housing 10. After having increased to a predetermined volume, the volume of the compression chamber decreases. After the volume of the compression chamber has decreased to a predetermined volume to discharge the refrigerant, the volume of the suction chamber increases in association with rotation of the rotary shaft 15, and a portion forming the compression chamber transitions to the suction chamber.

The second compression section 12T is configured substantially similar to the first compression section 12S, and is disposed above the first compression section 12S. The second compression section 12T has a second cylinder 121T, a second annular piston 125T, and a second vane (not shown). The second cylinder 121T forms a second cylinder chamber 130T. The second annular piston 125T is disposed in the second cylinder chamber 130T, and is slidably supported by the rotary shaft 15. A difference in a phase about the rotary shaft 15 between the second annular piston 125T and the first annular piston 125S is 180°. The second vane is supported by the second cylinder 121T to slide on the second cylinder chamber 130T. By abutting between the second vane and the second annular piston 125T, the inside of the second cylinder chamber 130T is divided into a suction chamber and a compression chamber. The suction chamber is not connected to the internal space 16 of the compressor housing 10, but is connected to the two intake openings 19.

In the second cylinder chamber 130T, the volume of the suction chamber increases in association with rotation of the rotary shaft 15. After having increased to a predetermined volume, the volume of the suction chamber decreases. When the volume of the suction chamber decreases, the volume of the compression chamber increases, and a portion forming the suction chamber transitions to the compression chamber. The compression chamber is not connected to the intake openings 19, but is connected to the internal space 16 of the compressor housing 10. After having increased to a predetermined volume, the volume of the compression chamber decreases. After the volume of the compression chamber has decreased to a predetermined volume to discharge the refrigerant, the volume of the suction chamber increases in association with rotation of the rotary shaft 15, and a portion forming the compression chamber transitions to the suction chamber.

[Configuration of Outdoor-Unit Controller]

The outdoor-unit controller 200 includes a so-called microcomputer, and has a not-shown central processing unit (CPU), a not-shown storage device, and a not-shown input/output device. The CPU executes a computer program installed in the outdoor-unit controller 200, thereby controlling the storage device and the input/output device. Further, the CPU controls each of the rotary compressor 21, the four-way valve 22, the throttle device 24, and the bypass valve 26. The storage device stores the computer program. The storage device stores information to be utilized by the CPU. The computer program installed in the outdoor-unit controller 200 includes multiple computer programs for causing the outdoor-unit controller 200 to implement each of multiple functions.

As described above, the refrigeration cycle device 1 of the first embodiment is configured as a single-type device having a single outdoor unit 2 and a single indoor unit 5 corresponding to the outdoor unit 2. Instead of such a configuration, the refrigeration cycle device 1 of the present embodiment may be configured as a multi-type device having a single outdoor unit 2 and multiple indoor units 5 corresponding to the outdoor unit 2.

[Characteristic Configuration of Rotary Compressor]

Next, a characteristic configuration of the rotary compressor 21 of the first embodiment will be described. In the compressor housing 10 of the rotary compressor 21, the flow of the refrigerant discharged from the compression section 12 toward the upper portion 10A of the compressor housing 10 through the motor 11 includes, as illustrated in FIG. 2, three types of flow including a first flow F1, a second flow F2, and a third flow F3.

The first flow F1 passes through a through-passage (not shown) in the rotor 112 along an axial direction of the rotary shaft 15. The first flow F deviates toward the outer peripheral side of the rotor 112 in association with rotation of the rotor 112. The second flow F2 passes through a clearance between the outer peripheral side of the rotor 112 and an inner peripheral side of the stator 111 along the axial direction of the rotary shaft 15. In a case where the second flow F2 comes into contact with the first flow F1, the second flow F2 is guided along a circumferential direction of the rotor 112, and deviates toward the outer peripheral side of the rotor 112 as in the first flow F1. In a case where the second flow F2 does not come into contact with the first flow F1, the second flow F2 heads upward in the vertical direction toward the upper portion 10A along the clearance between the outer peripheral side of the rotor 112 and the inner peripheral side of the stator 111. The third flow F3 passes through a clearance between an inner peripheral side of the body portion 10B of the compressor housing 10 and an outer peripheral side of the stator 111 along the axial direction of the rotary shaft 15.

The flow velocity of the refrigerant in the first flow F1, the second flow F2, and the third flow F3 as described above increases due to small flow passage sectional areas of the clearance and the through-passage of the motor 11, the refrigerant flowing through the clearance and the through-passage. Thus, the refrigerant is directly sprayed onto the upper portion 10A or the body portion 10B. The refrigerant sprayed onto the upper portion 10A flows toward the discharge pipe 41 of the upper portion 10A, and then, is discharged from the discharge pipe 41.

As described above, the region of the upper portion 10A onto which the refrigerant of the first flow F1, the second flow F2, and the third flow F3 having passed through the motor 11 is directly sprayed is positioned outside a circular projection area P of the rotor 112 at the upper portion 10A of the compressor housing 10 as illustrated in FIGS. 2 and 3. The projection area P of the rotor 112 at the upper portion 10A is illustrated as a circular hatched area in FIG. 3. For example, the projection area P is a projection area of the rotor 112 at the upper portion 10A of the compressor housing 10 on a plane perpendicular to a rotation axis direction of the motor 11.

In a case where a welded portion formed by welding using the flux, such as brazing, is disposed within the region (outside the projection area P) onto which the refrigerant is sprayed, potassium remaining on the welded portion serves as a catalyst, and therefore, reduces activation energy of disproportional reaction of the HFO1123 refrigerant. For this reason, collision energy upon collision of the HFO1123 refrigerant with the welded portion is provided to the HFO1123 refrigerant. Thus, there is a probability that the disproportional reaction is easily caused in the HFO1123 refrigerant. That is, the collision energy easily increases beyond the activation energy of the disproportional reaction, and therefore, the disproportional reaction is easily caused. For this reason, in the rotary compressor 21 using the HFO1123 refrigerant or the refrigerant mixture containing the HFO1123 refrigerant, it is preferable that a portion where the potassium contained in the flux used upon welding such as brazing remains is, for reducing the disproportional reaction of the HFO1123 refrigerant, not present outside the projection area P of the rotor 112 at the upper portion 10A.

Thus, in the rotary compressor 21, a first welded portion 161 is disposed within the projection area P of the rotor 112 at the upper portion 10A as illustrated in FIGS. 2 and 3. The first welded portion 161 is formed in such a manner that the upper portion 10A of the compressor housing 10 and the discharge pipe 41 are joined together by welding using the flux, such as brazing or arc welding. The first welded portion 161 is formed in a circumferential direction of an outer peripheral portion of the discharge opening 18. Thus, collision of the HFO123 refrigerant having passed through the motor 11 with the first welded portion 161 due to direct spraying of the HFO1123 refrigerant onto the first welded portion 161 is reduced. As a result, the disproportional reaction of the HFO1123 refrigerant collided with the upper portion 10A is reduced. Note that the first welded portion 161 may be formed in such a manner that the upper portion 10A of the compressor housing 10 and the discharge pipe 41 are joined together by laser welding using no flux. In this case, the first welded portion 161 may be disposed outside the projection area P. However, laser welding is at a higher cost as compared to welding using the flux, such as brazing and arc welding. The first welded portion 161 formed by welding using the flux is disposed within the projection area P so that the disproportional reaction can be reduced at low cost. Note that the first welded portion 161 of the present embodiment corresponds to an example of an inner welded portion. The inner welded portion means a welded portion inside the projection area (P) of the rotor 112 at the upper portion 10A.

An outer peripheral portion of the upper portion 10A of the compressor housing 10 is curved along an inner peripheral surface of the body portion 10B. The outer peripheral portion of the upper portion 10A is fitted in an inner peripheral portion of the body portion 10B. A second welded portion 162 is provided in such a manner that the outer peripheral portion of the upper portion 10A and the body portion 10B are laser-welded together. The second welded portion 162 is positioned outside the projection area P of the rotor 112 at the upper portion 10A, and is formed by laser welding. The second welded portion 162 is formed in a circumferential direction of an outer peripheral portion of the body portion 10B.

As described above, the second welded portion 162 is formed by laser welding. Thus, no flux is used upon welding between the outer peripheral portion of the upper portion 10A and the body portion 10B. Thus, no potassium remains on the second welded portion 162. Thus, even when the HFO1123 refrigerant having passed through the motor 11 is directly sprayed onto the second welded portion 162, the disproportional reaction of the HFO1123 refrigerant due to the potassium is not accelerated. Note that welding for forming the second welded portion 162 may be welding using no flux, and is not limited to laser welding.

Moreover, a third welded portion 163 is provided at the compressor housing 10 as illustrated in FIG. 2. The third welded portion 163 is formed in such a manner that the lower portion 10C and the body portion 10B are joined together by welding using the flux, such as brazing or arc welding, or laser welding. The third welded portion 163 is formed in the circumferential direction of the outer peripheral portion of the body portion 10B. Note that substantially no refrigerant with a high flow velocity is sprayed onto a portion (a position) where the third welded portion 163 is provided. Thus, the probability of causing the disproportional reaction of the refrigerant at the third welded portion 163 is low.

As illustrated in FIG. 3, an outer peripheral portion of the stator core 113 provided at the stator 111 of the motor 11 is fitted in the inner peripheral portion of the body portion 10B. A fourth welded portion 164 is provided between the outer peripheral portion of the stator core 113 and the inner peripheral portion of the body portion 10B. The fourth welded portion 164 is formed in such a manner that the stator core 113 and the body portion 10B are joined together by laser welding or welding using the flux, such as brazing or arc welding, for example. The fourth welded portion 164 is formed in the circumferential direction of the outer peripheral portion of the body portion 10B. As in the motor 11, an outer peripheral portion of the compression section 12 is fitted in the inner peripheral portion of the body portion 10B. A fifth welded portion 165 is formed between the compression section 12 and the body portion 10B. The fifth welded portion 165 is formed in such a manner that the compression section 12 and the body portion 10B are joined together by welding using the flux, such as brazing or arc welding, or laser welding, for example. The fifth welded portion 165 is formed in the circumferential direction of the outer peripheral portion of the body portion 10B.

As described above, in the rotary compressor 21 of the embodiment, the HFO1123 refrigerant or the refrigerant mixture containing the HFO1123 refrigerant is used as the refrigerant. Further, the first welded portion 161 formed by welding using the flux is provided within the projection area P of the rotor 112 at the upper portion 10A of the compressor housing 10. Thus, collision of the HFO1123 refrigerant having passed through the motor 11 with the first welded portion 161 due to direct spraying of the HFO1123 refrigerant onto the first welded portion 161 where the potassium remains is reduced. Consequently, lowering of the activation energy of the disproportional reaction of the HFO1123 refrigerant can be suppressed. As a result, the disproportional reaction of the HFO1123 refrigerant collided with the upper portion 10A can be reduced.

Moreover, in the rotary compressor 21 of the embodiment, the second welded portion 162 is provided outside the projection area P of the rotor 112 at the upper portion 10A. The second welded portion 162 is formed in such a manner that the upper portion 10A and the body portion 10B of the compressor housing 10 are joined together by laser welding. Thus, when the HFO1123 refrigerant having passed through the motor 11 is directly sprayed onto the upper portion 10A, even if the HFO1123 refrigerant collides with the second welded portion 162, acceleration of the disproportional reaction of the HFO1123 refrigerant can be suppressed.

Hereinafter, other embodiments will be described with reference to the drawings. For the sake of convenience, the same reference numerals as those of the first embodiment are used to represent identical components in these other embodiments, and description thereof will not be repeated.

Second Embodiment

Figure 4:
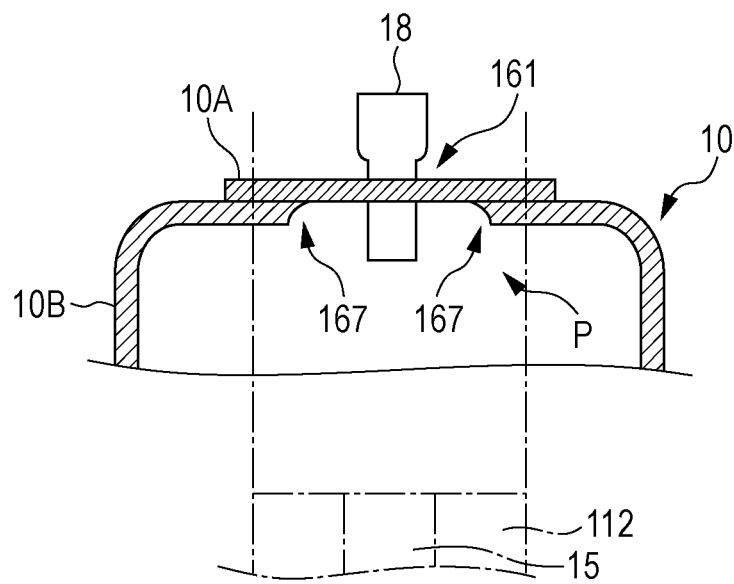
FIG. 4 is a longitudinal sectional view of a first welded portion at a compressor housing of a rotary compressor of a second embodiment.

FIG. 4 is a longitudinal sectional view of a first welded portion at a compressor housing 10 of a rotary compressor of a second embodiment. The second embodiment is different from the first embodiment in the position of a second welded portion as a welded portion between an upper portion 10A and a body portion 10B of the compressor housing 10.

In the above-described first embodiment, the second welded portion 162 as the welded portion between the upper portion 10A and the body portion 10B of the compressor housing 10 is disposed outside the projection area P of the rotor 112 at the upper portion 10A. On the other hand, the rotary compressor of the second embodiment is configured such that a second welded portion 167 between the upper portion 10A and the body portion 10B is disposed within a projection area P of a rotor 112 at the upper portion 10A as illustrated in FIG. 4. That is, in the second embodiment, a first welded portion 161 and the second welded portion 167 formed by welding using flux, such as brazing or arc welding, are each provided within the projection area P of the rotor 112 at the upper portion 10A. Note that the first welded portion 161 and the second welded portion 167 of the present embodiment correspond to examples of an inner welded portion.

In the second embodiment, the upper portion 10A of the compressor housing 10 is formed in a discoid shape. Further, an upper end portion of the cylindrical body portion 10B is curved inward of the body portion 10B. That is, the upper end portion of the cylindrical body portion 10B is formed along a direction perpendicular to the center axis of the body portion 10B (an axial direction of a rotary shaft 15). In the second embodiment, the second welded portion 167 formed in such a manner that the upper portion 10A and the body portion 10B are joined together by welding using the flux is disposed within the projection area P of the rotor 112 at the upper portion 10A. The second welded portion 167 is formed in a circumferential direction of an outer peripheral portion of the discoid upper portion 10A.

In the second embodiment, collision of HFO1123 refrigerant having passed through a motor 11 with the first welded portion 161 and the second welded portion 167 due to direct spraying of the HFO1123 refrigerant onto the first welded portion 161 and the second welded portion 167 is also reduced. Consequently, disproportional reaction of the HFO1123 refrigerant collided with the upper portion 10A can be reduced.

Third Embodiment

Figure 5:
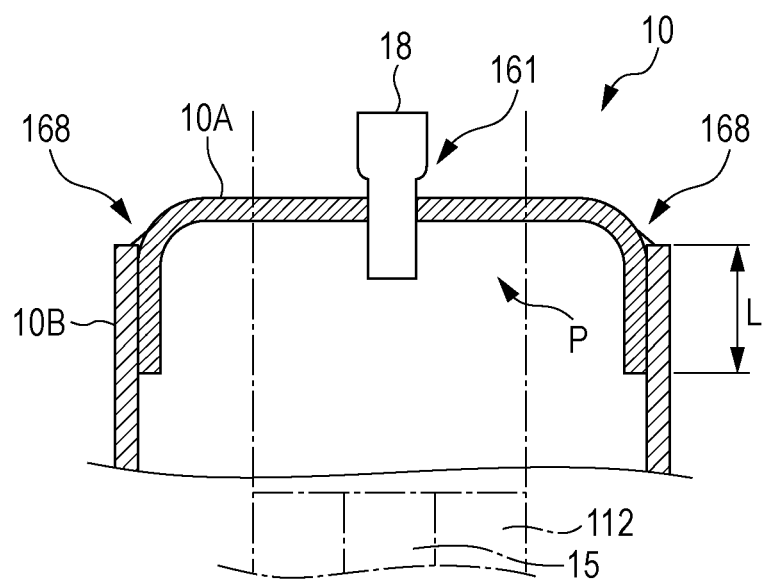
FIG. 5 is a longitudinal sectional view for describing a second welded portion at a compressor housing of a rotary compressor of a third embodiment.

FIG. 5 is a longitudinal sectional view for describing a second welded portion at a compressor housing 10 of a rotary compressor of a third embodiment. The third embodiment is different from the first embodiment in the second welded portion.

In the first embodiment, the second welded portion 162 is formed in such a manner that the upper portion 10A and the body portion 10B of the compressor housing 10 are joined together by laser welding. On the other hand, in the third embodiment, a second welded portion 168 is formed in such a manner that an upper portion 10A and a body portion 10B are joined together by welding using flux, such as brazing or arc welding, as illustrated in FIG. 5.

An outer peripheral portion of the upper portion 10A is curved along an inner peripheral surface of the body portion 10B. The outer peripheral portion of the upper portion 10A is fitted in an inner peripheral portion of the body portion 10B. The second welded portion 168 is formed in such a manner that the outer peripheral portion of the upper portion 10A and the body portion 10B are joined together by welding. The second welded portion 168 is disposed outside a projection area P of a rotor 112 at the upper portion 10A. The second welded portion 168 is formed in a circumferential direction of an outer peripheral portion of the body portion 10B. Note that the second welded portion 168 of the present embodiment corresponds to an example of an outer welded portion. The outer welded portion means a welded portion outside the projection area P of the rotor 112 at the upper portion 10A.

The second welded portion 168 is formed such that the dimension (an overlapping margin) L of an overlapping portion between the upper portion 10A (the outer peripheral portion of the upper portion 10A) and an upper end portion of the body portion 10B is equal to or greater than 15 [mm]. Such a dimension L is a length in a direction along the rotation axis of a motor 11, for example. A compressor housing with a typical size is formed such that the dimension L of an overlapping portion between an outer peripheral portion of an upper portion and an upper end portion of a body portion is about 8 [mm]. Thus, the dimension L in the third embodiment is formed about twice as large as that of the typical compressor housing. This suppresses the flux applied to the outer peripheral portion of the body portion 10B from reaching an inner peripheral surface side of the body portion 10B through a clearance between the outer peripheral portion of the upper portion 10A and the upper end portion of the body portion 10B upon welding using the flux, such as brazing or arc welding.

The second welded portion 168 in the third embodiment is formed in such a manner that the outer peripheral portion of the upper portion 10A and the upper end portion of the body portion 10B are joined together by welding using the flux. However, the dimension (the overlapping margin) L of the overlapping portion between the outer peripheral portion of the upper portion 10A and the upper end portion of the body portion 10B is equal to or greater than 15 [mm]. This suppresses potassium from remaining on an inner peripheral surface of the compressor housing 10 (the inside of the outer peripheral portion of the upper portion 10A and the inside of the upper end portion of the body portion 10B) at the second welded portion 168. Thus, even when HFO1123 refrigerant is directly sprayed onto the second welded portion 168 disposed outside the projection area P of the rotor 112 at the upper portion 10A, disproportional reaction of the HFO1123 refrigerant can be reduced.

Note that the first, second, and third embodiments are applied to the two-cylinder rotary compressor 21. However, the first, second, and third embodiments may be applied to a single-cylinder rotary compressor.

The embodiments of the present disclosure may be the following first to fourth rotary compressors and the following first refrigeration cycle device.

The first rotary compressor is a rotary compressor including a closed upright cylindrical compressor housing having an upper portion provided with a discharge section of refrigerant and a body portion provided with an intake section of the refrigerant, a compression section disposed at a lower part in the compressor housing and configured to compress the refrigerant sucked by the intake section to discharge the refrigerant from the discharge section, and a motor disposed at an upper part in the compressor housing and configured to drive the compression section, the motor having a rotor disposed on an inner side and a stator disposed on an outer side. In the rotary compressor, the refrigerant is HFO1123 refrigerant or a refrigerant mixture containing the HFO1123 refrigerant, and a first welded portion as a joint portion joined using flux is provided within a projection area of the rotor at the upper portion of the compressor housing on a plane perpendicular to a rotation axis direction of the motor.

The second rotary compressor is the first rotary compressor in which the first welded portion includes a welded portion as a joint between the upper portion of the compressor housing and the discharge section.

The third rotary compressor is the first or second rotary compressor in which the first welded portion includes a welded portion as a joint between the upper portion and the body portion of the compressor housing.

The fourth rotary compressor is the first or second rotary compressor in which a second welded portion as a joint portion between an outer peripheral portion of the upper portion of the compressor housing and the body portion of the compressor housing is provided outside the projection area of the rotor at the upper portion and is formed such that the dimension of an overlapping portion between the outer peripheral portion of the upper portion of the compressor housing and the body portion of the compressor housing in the rotation axis direction of the motor is equal to or greater than 15 [mm].

The first refrigeration cycle device includes any one of the first to fourth rotary compressors and a circulation passage in which refrigerant compressed by the rotary compressor flows.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rotary compressor comprising:
a closed upright cylindrical compressor housing including an upper portion provided with a discharge section of refrigerant and a body portion provided with an intake section of the refrigerant;
a compression section disposed at a lower part in the compressor housing and configured to compress the refrigerant suctioned by the intake section to discharge the refrigerant from the discharge section; and
a motor disposed at an upper part in the compressor housing and configured to drive the compression section,
wherein the motor has a rotor disposed on an inner side and a stator disposed on an outer side,
the refrigerant is HFO1123 refrigerant or a refrigerant mixture containing the HFO1123 refrigerant, and
an inner welded portion containing potassium is provided within a projection area of the rotor at the upper portion of the compressor housing.

2. The rotary compressor according to claim 1, wherein the inner welded portion includes a first welded portion between the upper portion of the compressor housing and the discharge section.

3. The rotary compressor according to claim 2, wherein the inner welded portion includes a second welded portion between the upper portion and the body portion of the compressor housing.

4. The rotary compressor according to claim 2, wherein
an outer welded portion formed by welding is provided outside the projection area of the rotor at the upper portion,
the outer welded portion includes a second welded portion between the upper portion and the body portion of the compressor housing, and
at the second welded portion, a dimension of an overlapping portion between the upper portion and the body portion of the compressor housing is equal to or greater than 15 [mm].

5. The rotary compressor according to claim 1, wherein the inner welded portion includes a second welded portion between the upper portion and the body portion of the compressor housing.

6. The rotary compressor according to claim 1, wherein
an outer welded portion formed by welding is provided outside the projection area of the rotor at the upper portion,
the outer welded portion includes a second welded portion between the upper portion and the body portion of the compressor housing, and
at the second welded portion, a dimension of an overlapping portion between the upper portion and the body portion of the compressor housing is equal to or greater than 15 [mm].

7. A refrigeration cycle device comprising:
the rotary compressor according to claim 1; and
a refrigerant circuit configured such that refrigerant compressed by the rotary compressor flows.

* * * * *